United States Patent
Yano

(10) Patent No.: US 8,213,744 B2
(45) Date of Patent: Jul. 3, 2012

(54) IMAGE PROCESSING APPARATUS AND STORAGE MEDIUM STORING IMAGE PROCESSING PROGRAM

(75) Inventor: Takahiro Yano, Hachioji (JP)

(73) Assignee: Olympus Corporation, Tokyo (JP)

( * ) Notice: Subject to any disclaimer, the term of this patent is extended or adjusted under 35 U.S.C. 154(b) by 351 days.

(21) Appl. No.: 12/622,797

(22) Filed: Nov. 20, 2009

(65) Prior Publication Data

US 2010/0067820 A1    Mar. 18, 2010

Related U.S. Application Data

(63) Continuation of application No. PCT/JP2008/059760, filed on May 21, 2008.

(30) Foreign Application Priority Data

May 23, 2007   (JP) ................ 2007-136647

(51) Int. Cl.
*G06K 9/40* (2006.01)
*G06K 9/32* (2006.01)
*G06K 9/36* (2006.01)

(52) U.S. Cl. .............. 382/294; 382/260; 382/280
(58) Field of Classification Search .......... 382/260, 382/280, 294
See application file for complete search history.

(56) References Cited

U.S. PATENT DOCUMENTS

| | | | | |
|---|---|---|---|---|
| 6,155,704 A * | 12/2000 | Hunt et al. | ........... | 342/25 F |
| 7,097,311 B2 * | 8/2006 | Jaynes et al. | ............ | 353/122 |
| 7,602,997 B2 * | 10/2009 | Young | ............ | 382/299 |
| 7,840,095 B2 * | 11/2010 | Yamada | ............ | 382/299 |
| 8,064,712 B2 * | 11/2011 | Wheeler et al. | ............ | 382/254 |

FOREIGN PATENT DOCUMENTS

WO    WO 2006/052029 A1    5/2006

OTHER PUBLICATIONS

Chang et al., "Two Steps Registration of Area Selection Registration Robust to Lighting Change and Occlusion", Speech Thesis Collection for Meeting on Image Recognition and Understanding (MIRU2006), Jul. 2006, pp. 229-234.

Toda et al. "Super Resolution Process in Consideration of Registration Error", Speech Thesis Collection for 5th Forum on Information and Technology (FIT2006), 2006, pp. 63-64.

* cited by examiner

*Primary Examiner* — Stephen R Koziol
(74) *Attorney, Agent, or Firm* — Scully, Scott, Murphy & Presser, P.C.

(57) ABSTRACT

An image processing apparatus includes a registration unit for executing a registration process among a plurality of images; an image synthesis unit for superposing the plurality of images subjected to registration in the registration unit to synthesize the plurality of images and generate a synthetic image; a frequency characteristic measurement unit for measuring a frequency characteristic of the synthetic image; and a registration error detection unit for detecting an error of the registration process among the plurality of images based on the measured frequency characteristic of the synthetic image.

22 Claims, 9 Drawing Sheets

ERROR VERIFICATION IMAGE

ERROR-LESS IMAGE

VERTICAL CYCLE Tv=-3[pixel]

VERTICAL CYCLE Tv=0[pixel]

VERTICAL CYCLE Tv=3[pixel]

HORIZONTAL CYCLE Th=-3[pixel]

HORIZONTAL CYCLE Th=0[pixel]

HORIZONTAL CYCLE Th=3[pixel]

IMAGE PROCESSING APPARATUS AND STORAGE MEDIUM STORING IMAGE PROCESSING PROGRAM

CROSS REFERENCE TO RELATED APPLICATIONS

This application is a continuation of International Patent Application No. PCT/JP2008/059760, filed on May 21, 2008, which claims the benefit of Japanese Patent Application No. JP 2007-136647, filed on May 23, 2007, which are incorporated by reference as if fully set forth.

FIELD OF THE INVENTION

The present invention relates to techniques for executing a registration process among a plurality of sheets of images, and in particular, techniques for detecting an error that has occurred in the registration process among a plurality of sheets of images.

BACKGROUND OF THE INVENTION

Conventionally, in the case of handling a plurality of sheets of images, an image registration process has become a necessary technique for establishing positional correspondence between the images, as the foundation of image processing techniques. For example, in the case of executing an image mosaicing process (a process which executes registration of a plurality of images having overlaps and obtains one whole image) and a super resolution process, it is necessary to execute a synthesizing process of a plurality of sheets of images. If there is an error in the registration process of the images used at the time of the synthesis process, the synthesis process fails and a desired image processing result can not be obtained.

For example, an image super resolution process is proposed as an image-resolution increasing technique using a plurality of sheets of images (refer to WO06/052029).

In recent years, as for methods to detect registration errors in the case where an image registration process is executed, several reports are reported as in the following:
(1) Chang, Shimizu, and Okutomi, "Two Steps Registration of Area Selection Registration Robust to Lighting Change and Occlusion", Speech Thesis Collection for Meeting on Image Recognition and Understanding (MIRU2006), Jul., 2006, p. 229-234; and
(2) Toda, Tsukada, and Inoue, "Super Resolution Process in Consideration of Registration Error", Speech Thesis Collection for 5th Forum on Information and Technology (FIT2006), 2006, p. 63-64.

SUMMARY OF THE INVENTION

An image processing apparatus according to one aspect of this invention, comprising: a registration unit for executing a registration process among a plurality of images; an image synthesis unit for superposing the plurality of images subjected to registration in the registration unit to synthesize the plurality of images and generate a synthetic image; a frequency characteristic measurement unit for measuring a frequency characteristic of the synthetic image; and a registration error detection unit for detecting an error of the registration process among the plurality of images based on the measured frequency characteristic of the synthetic image.

A computer readable storage medium according to another aspect of this invention stores an image processing program. The image processing program instructs a computer to execute a method comprising: a registration step for executing a registration process among a plurality of images; an image synthesis step for superposing and synthesizing the plurality of images subjected to registration in the registration step, so as to generate an synthetic image; a frequency characteristic measurement step for measuring a frequency characteristic of the synthetic image; and a registration error detection step for detecting an error of the registration process among the plurality of images based on the measured frequency characteristic of the synthetic image.

DESCRIPTION OF THE PREFERRED EMBODIMENT

Figure 1:
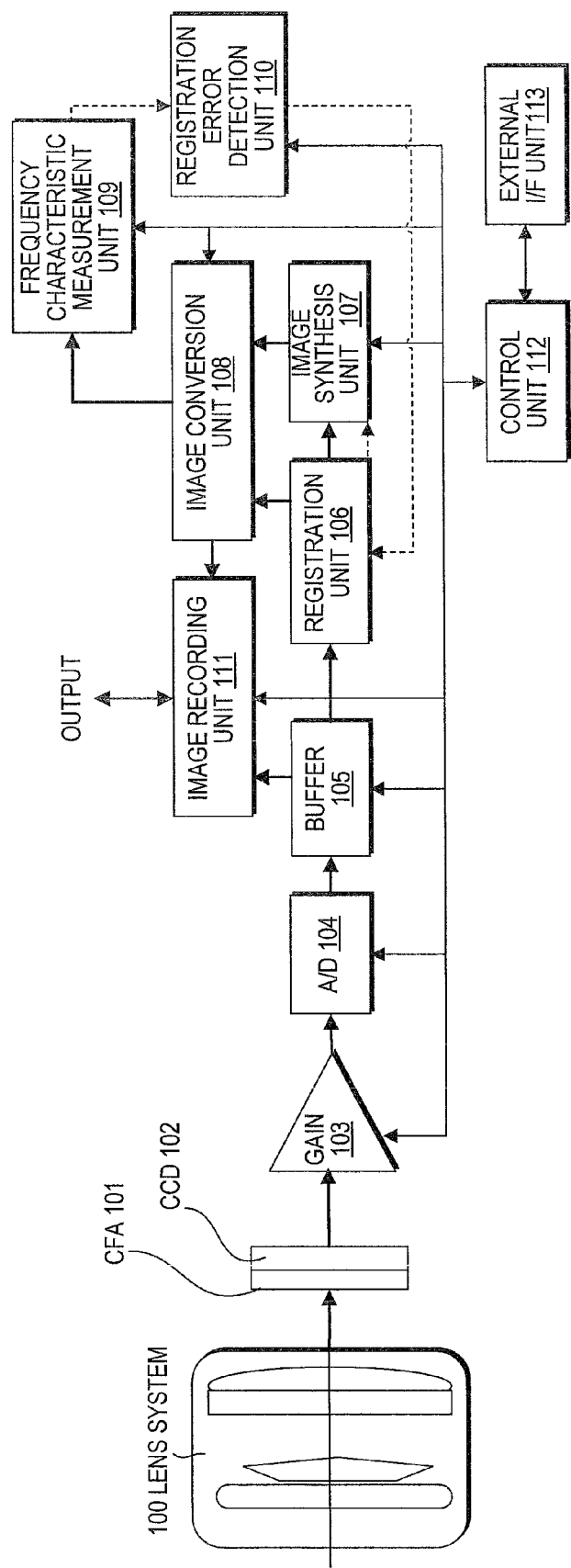
FIG. 1 is a block diagram showing an image processing apparatus in accordance with the first embodiment.

FIG. 1 depicts a block diagram showing an image processing apparatus in accordance with the first embodiment.

A video signal acquired through a lens system 100, a color filter array (CFA) 101, and a charge coupled device (CCD) 102 is amplified at an amplifier (Gain) 103, and is converted into a digital signal at an A/D converter (A/D) 104. The A/D converter 104 is connected to a buffer 105 (buffer memory). The buffer 105 is connected to a registration unit (registration means) 106 and an image recording unit (image recording means) 111. The registration unit 106 is connected to an image synthesis unit (image synthesis means) 107 and an image conversion unit (image conversion means) 108.

The image synthesis unit 107 is connected to the image conversion unit 108. The image conversion unit 108 is connected to a frequency characteristic measurement unit (frequency characteristic measurement means and frequency characteristic detection means) 109 and an image recording unit 111. The frequency characteristic measurement unit 109 is connected to a registration error detection unit (registration error detection means) 110. The registration error detection unit 110 is connected to the registration unit 106. The image recording unit 111 is connected to an output interface (output) for outputting a video signal to the outside.

Figure 2:
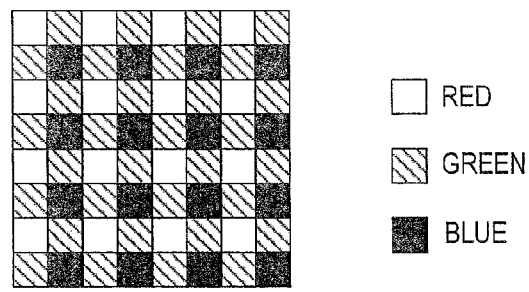
FIG. 2 is a diagram showing a Bayer type primary color filter.

Hereafter, the flow of the video signal in FIG. 1 will be described. After setting shooting conditions, such as ISO sensitivity, through an external user interface unit (external I/F unit) 113, it enters into a pre-shooting mode (preliminary shooting mode) by half-pressing a shutter button mounted in the external I/F unit 113. The external I/F unit 113 may adopt various configurations, and may be configured by a touch sensor which performs various kinds of setting on a display screen, an operation button, such as a shutter button, or an operation dial, etc. The video signal acquired through the lens system 100, the CFA 101, and the CCD 102 is outputted as an analog signal. It is noted that in the present embodiment, as to the CCD 102, a single CCD which arranges in the front a Bayer type primary color filter as the CFA 101 is used in the shooting system. The Bayer type primary color filter uses 2×2 pixels as a base unit, wherein one pixel red (R) filter and one pixel blue (B) filter are arranged in a base unit and two pixels green (G) filters are also arranged in the base unit (refer to FIG. 2).

Here, the CCD 102 shoots an image when the shutter button mounted on the external I/F unit 113 is pushed down. The image data is transmitted to the registration unit 106 or the image recording unit 111 (image storage memory) sequentially through the amplifier 103, the A/D converter 104, and the buffer 105. Here, whether the shot image data is transferred to the registration unit 106 or to the image recording unit 111 depends on the saving method set through the external I/F unit 113. That is, if it is set to save an image to the image recording unit 111 without change, a registration process (alignment process) among a plurality of sheets of images is not executed. Therefore, the shot image data is recorded in the image recording unit 111.

If the image is not recorded in the image recording unit 111, the image data acquired through the buffer 105 undergoes a registration process (coordinate transformation process) by the registration unit 106 in sequence. Thereafter, the image subjected to the registration process in the registration unit 106 is transferred to the image synthesis unit 107, and goes through an image synthesis process. The synthetic image subjected to the image synthesis in the image synthesis unit 107 is transferred to the image conversion unit 108. Simultaneously, the image data transferred to the registration unit 106 may be transferred to the image conversion unit 108 without modification. A setting process by the external I/F unit 113 determines whether to execute the transfer or not.

The image subjected to the image conversion in the image conversion unit 108 is transferred to the frequency characteristic measurement unit 109. In the frequency characteristic measurement unit 109, a frequency characteristic value is measured for the image subjected to the conversion in the image conversion unit 108. The frequency characteristic value is transferred to the registration error detection unit 110. In the registration error detection unit 110, registration error determination is executed based on the frequency characteristic value transferred from the frequency characteristic measurement unit 109.

The registration error determination information outputted as a determination result is transferred to the registration unit 106. On the basis of the registration error determination information transferred from the registration error detection unit 110, the registration unit 106 executes again a registration process by applying a registration image exclusion process, a re-registration process, etc. At the time when the registration process and the image conversion process are ended, the image subjected to the image conversion in the image conversion unit 108 is transferred to the image recording unit 111, to go through the image recording.

Through the external I/O interface, the image recorded in the image recording unit 111 can be freely utilized as an image resource by an interconnection of the image recording unit 111 and external apparatus of the image processing system.

Hereinafter, the registration process of the registration unit 106 will be described.

Figure 3:
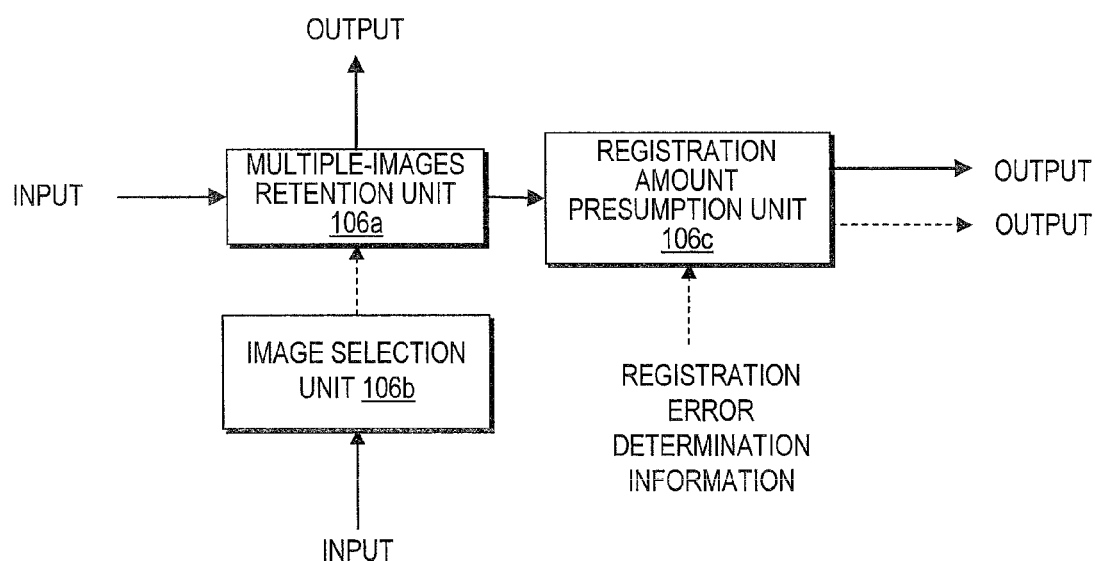
FIG. 3 is a block diagram of a registration unit (registration means).

As described in the above, the video signal acquired through the lens system 100, the CFA 101, and the CCD 102 is amplified at the amplifier 103. The video signal is converted into a digital signal in the A/D 104, and is transferred to a registration unit through the buffer 105 sequentially to undergo the registration process. FIG. 3 depicts a block diagram of the registration unit 106. The registration unit 106 includes a multiple-images retention unit 106a, the image selection unit 106b, and the registration amount presumption unit 106c.

The multiple-images retention unit 106a is connected to each of the input line from the buffer 105, the output line to the image conversion unit 108, the image selection unit 106b, and the registration amount presumption unit 106c. The image selection unit 106b is connected to each of control signal lines from the multiple-images retention unit 106a and the control unit 112. The registration amount presumption unit 106c is connected to the input line from the multiple-images retention unit 106a and the registration error detection unit 110, and the output line to the image synthesis unit 107.

Hereinafter, the signal flow in FIG. 3 will be described. The image data inputted from the buffer 105 is sequentially transferred to the multiple-images retention unit 106a. It is possible to hold a plurality of sheets of images in the multiple-images retention unit 106a. If a plurality of sheets of image data is stored in the multiple-images retention unit 106a, image selection for executing a registration process is done in the image selection unit 106b. The image selection unit 106b selects a standard image which is used as a standard for the registration process and reference image(s) for which registration amount(s) should be presumed with respect to the standard image.

Examples of the method of selecting the standard image and the reference image include determining the image specified in the external I/F unit 113 at a certain timing as the standard image by using the control unit 112, and determining the image(s) acquired thereafter as the reference image(s). Other methods include selecting the image acquired first as the standard image, and selecting the image(s) acquired thereafter as the reference image(s). The standard image and the reference image selected in the image selection unit 106b as such are transferred to the registration amount presumption unit 106c from the multiple-images retention unit 106a. The standard image and the reference image transferred to the registration amount presumption unit 106c go through a registration amount presumption process using the standard image as a standard in the registration amount presumption unit 106c. The registration amount presumption process is executed as follows.

Figure 4:
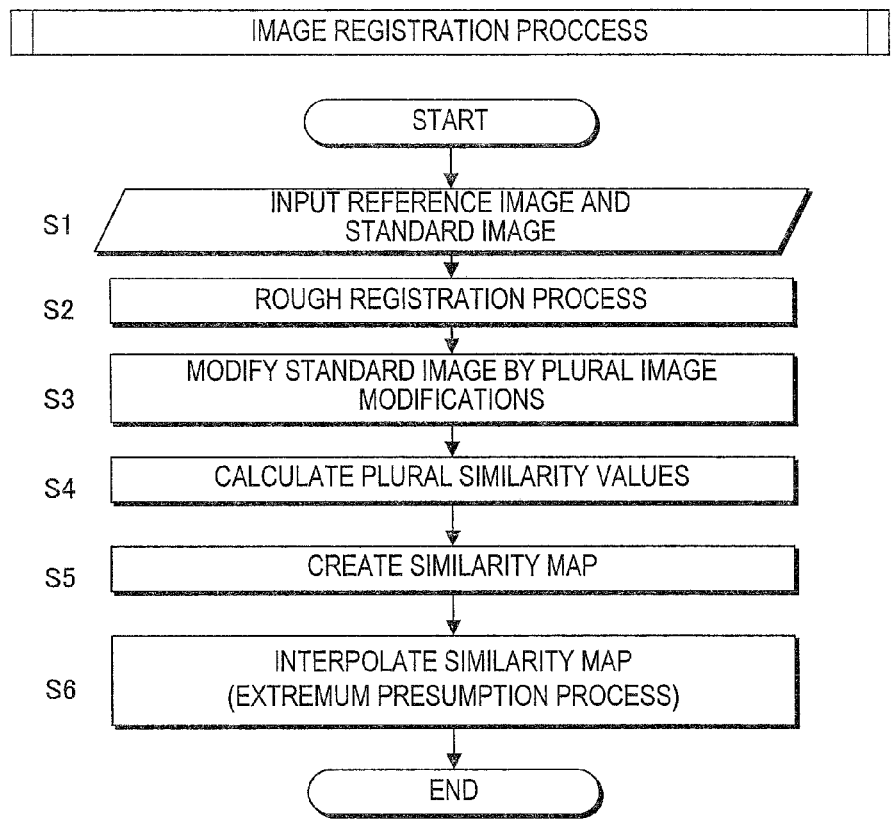
FIG. 4 is a flow chart which shows an image registration process.

The flow chart in FIG. 4 shows the details of an algorithm of registration amount presumption for obtaining the pixel corresponding position, which is a presumption means to presume an image displacement amount (displacement vector) as a registration amount. Hereafter, the invention will be described according to the algorithm flow.

In Step S1, the reference image and the standard image, which are targets for the presumption of the image displacement amount, are read. In Step S2, a rough registration process is executed between the standard image and the reference image. As for the rough registration process, methods such as an area-based pixel matching method and a registration method based on a gradient method of a characteristic point base, can be used.

In Step S3, the standard image is modified (or shifted) by a plurality of image displacements, to generate an image sequence. In Step S4, the similarity values are computed between the reference image and the images of the image sequence obtained by the plurality of image modifications of the standard image. For example, an SSD (Sum of Squared Difference) value can be used as the similarity value.

In Step S5, a discrete similarity map is created using the relation between the image displacement and the similarity value. In Step S6, the extremum of continuous similarity values is searched and obtained by interpolating the discrete similarity map created in Step S5. The image displacement having the extremum is the registration amount which should be obtained. As for the method of searching the extremum of a similarity map, there are a parabola fitting (quadratic function fitting) method, a spline interpolation method, etc.

Figure 5:
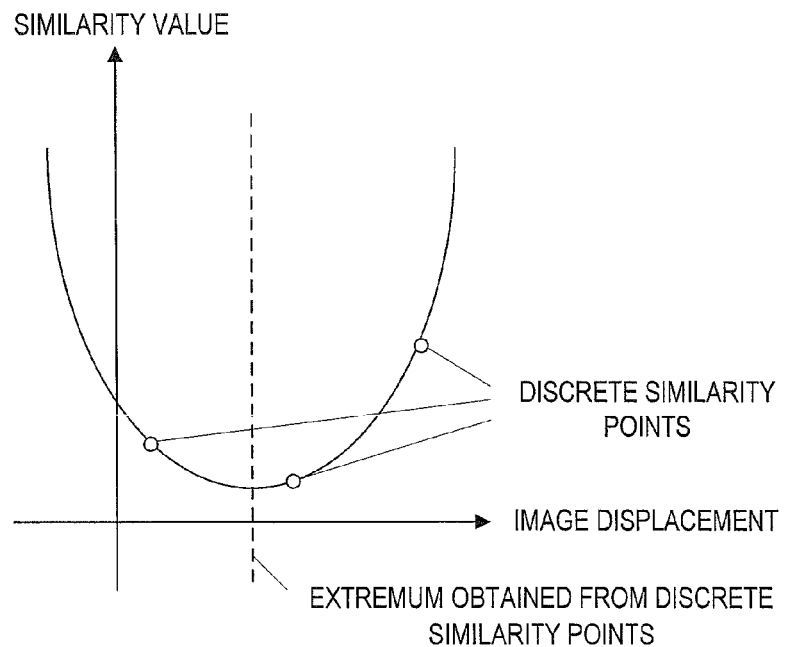
FIG. 5 is a diagram showing presumption of an image displacement amount by a parabola fitting.

FIG. 5 depicts an example which executed an image displacement presumption by a parabola fitting. The vertical axis expresses the similarity value. The smaller the similarity value, the stronger the similarity between the modified standard image and the reference image. In the method for searching the extremum of the similarity map by a parabola fitting or a spline interpolation, etc., in Step S6, it is possible to presume the registration amount having resolution finer than the pixel unit of the standard image and the reference image. One standard image and other reference images among a plurality of images are aligned and the registration amount of the reference image with respect to the standard image is detected with higher resolution than the pixel unit. Therefore, it is possible to execute the registration error detection with higher resolution.

The registration amount presumed in the registration amount presumption unit 106c as described in the above is transferred to the image synthesis unit 107 through the output line to the image synthesis unit 107. Simultaneously, the standard image and the reference image aligned in the registration amount presumption unit 106c are also transferred to the image synthesis unit 107 through the output line to the image synthesis unit 107. Here, if the registration process of the three or more sheets of images is executed, the standard image may be used a plurality of times in the registration amount presumption unit 106c. In this case, once the standard image is transferred to the image synthesis unit 107, it is not necessary to transfer the same standard image again.

As described in the above, the registration amount presumed in the registration unit 106, the standard image and the reference image which went through the registration process are transferred to the image synthesis unit 107 to undergo an image synthesis process. The image synthesis process is executed in the image synthesis unit 107, as follows.

Figure 6:
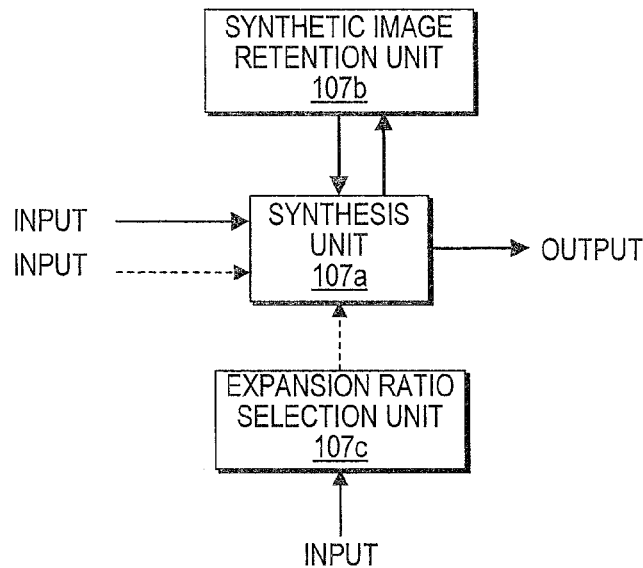
FIG. 6 is a block diagram of an image synthesis unit (image synthesis means).

FIG. 6 depicts a block diagram of the image synthesis unit 107. The image synthesis unit 107 includes a synthesis unit 107a, a synthetic image retention unit 107b, and an expansion ratio selection unit 107c. The synthesis unit 107a is connected to each of the input line from the registration unit 106, the synthetic image retention unit 107b, the expansion ratio selection unit 107c, and the output line to the image conversion unit 108. The synthetic image retention unit 107b is connected to the synthesis unit 107a. The expansion ratio selection unit 107c is connected to the synthesis unit 107a and a control signal line from the control unit 112.

Hereafter, the signal flow in FIG. 6 will be described. The image data and the registration amount of the standard image and the reference image, which are inputted from the registration unit 106, are transferred sequentially to the synthesis unit 107a, to go through an image synthesis process. Before executing the image synthesis process, the expansion ratio of the synthetic image is defined. The expansion ratio is selected in the expansion ratio selection unit 107c, and the selected expansion ratio is transferred to the synthesis unit 107a. As to the expansion ratio in the expansion ratio selection unit 107c, for example, the expansion ratio specified in the external I/F unit 113 at a certain timing is transferred to the expansion ratio selection unit 107c via the control unit 112. Thus, the transferred expansion ratio may be used as the expansion ratio in the expansion ratio selection unit 107c. Moreover, if the number of a plurality of sheets of images used for the image synthesis is determined in advance, the expansion ratio may be set according to the number of sheets.

The expansion ratio, which was selected in the expansion ratio selection unit 107c and was transferred to the synthesis unit 107a, is used in the synthesis unit 107a. The memory area of the size according to the expansion ratio is provided in the synthesis unit 107a, and the synthetic image is generated in the memory area. For example, the size according to the expansion ratio is the product of the size of the standard image and the reference image before being transferred to the image synthesis unit 107, and the square of the expansion ratio. In the image synthesis process, first, the pixel data of the standard image expanded by the above expansion ratio is copied to the memory area of the synthetic image. Next, the information of a displacement relative to the coordinates of the standard image is calculated from the registration amount (displacement vector) transferred from the registration unit 106. (For example, this displacement is computed by multiplying the registration amount by the expansion ratio.) The pixel data of the reference image expanded with the expansion ratio is copied at the position of the coordinates of the synthetic image which is displaced by the displacement corresponding to the registration amount. Here, if position information finer than the pixel unit of the synthetic image is obtained, the information may be disregarded. However, the pixel interpolation process may be done based on that information.

Thus, the standard image and the reference image are synthesized after being expanded such that they are synthesized based on the registration amount in a resolution space whose resolution is higher than the pixel unit of the original standard image and reference image. Therefore, it is possible to acquire synthetic images having higher resolution. Moreover, it is possible to execute more specific measurement of frequency characteristic.

Thus, synthetic images are generated in the memory area for synthetic images. In such a process, a memory area where a pixel is never copied may exist in the memory area of the synthetic image. The pixel belonging to such a memory area is defined as an "undefined pixel" (a pixel which does not have a pixel value). For example, the value, "0" is assigned to the pixel. The final synthetic image is generated as described in the above. FIG. 7 depicts a schematic view of a synthetic image generation.

Figure 7A:
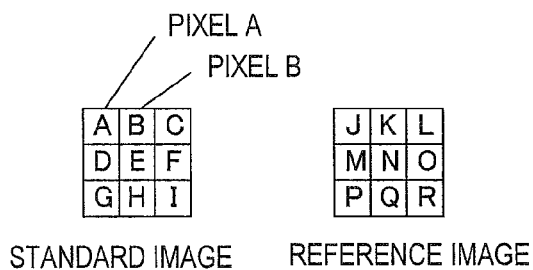
FIG. 7A is the standard image and the reference image to which an image synthesis process is executed.
Figures 7B, 7C:
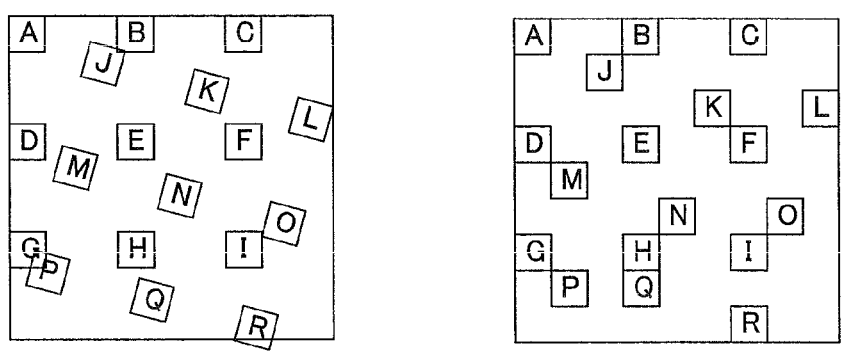
FIG. 7B is a diagram showing a situation where a registration process is executed to the standard image and the reference image.
FIG. 7C is a diagram in which each pixel of the reference image is fitted to the nearest pixel of the synthetic image.

FIG. 7A shows the standard image and the reference image for which an image synthesis process is executed in the synthesis unit 107a. The standard image is illustrated as having pixels A-I and the reference image is illustrated as having pixels J-R. FIG. 7B depicts a situation where the standard image and the reference image went through the registration process in the memory area of the synthetic image based on the registration amount transferred from the registration unit 106. Since the standard image is used as the standard for the synthetic image, it is possible to execute the registration process definitely by a pixel unit. On the other hand, as to the reference image, the accuracy in the registration amount is finer than the pixel unit of the synthetic image. Therefore, a process is executed which fixes the registration of accuracy finer than the pixel unit of the synthetic image to the pixel unit of the synthetic image. That is, a registration process is executed while adapting the pixel of the reference image to the nearest pixel unit of the synthetic image. FIG. 7C is derived by executing the registration process to the pixel unit of this synthetic image. The synthetic image is generated by this registration process in FIG. 7C.

In the case where two times or more of pixel registration processes are executed in the same pixel position at the time of an image synthesis process, an averaging process of a plurality of pixels is executed. Moreover, if the standard image and the reference image are RGB images acquired through the Bayer type filter, the above processing is executed for each of RGB independently to generate the synthetic image of each of the three colors of RGB, and then the synthetic images of the three colors are combined to derive an output image.

As described in the above, the synthetic image generated in the synthesis unit 107a is transferred to the image conversion unit 108 through the output line to the image conversion unit 108. Here, in the case where an image synthesis process for three or more sheets of images is executed, the synthetic image generated from a set of the standard image and a reference image is retained in the synthetic image retention unit 107b. The synthetic image held at this synthetic image retention unit 107b may be again transferred to the synthesis unit 107a and to be used as a memory area of the synthetic image when the image synthesis process of a pair of the standard image and another reference image is executed. Thereafter, the generated synthetic image is transferred to and retained in the synthetic image retention unit 107b again. When the image synthesis process of a pair of the standard image and another reference image is executed again, the synthetic image is transferred to the synthesis unit 107a again as a memory area of the synthetic image to be used. The image synthesis process of three or more sheets of images is executed by repeating the above.

The synthetic image generated in the image synthesis unit 107 as described in the above is transferred to the image conversion unit 108 to undergo an image conversion process. Here, as to the synthetic image transferred from the image synthesis unit 107, it is not limited to the synthetic image which is obtained by synthesizing the reference image(s) in the image synthetic unit, and the image before synthesizing the reference image(s) may be transferred simultaneously.

The image conversion process in the image conversion unit 108 is executed as follows.

As an example, as to the synthetic image transferred from the image synthesis unit 107, the image conversion unit 108 executes the interpolation or presumption of an undefined pixel included in the synthetic image to define a pixel value for all the pixels. In the case where an undefined pixel exists in the synthetic image, computation processing for frequency characteristic acquisition is simplified by assigning a pixel value to the undefined pixel. Moreover, it becomes possible to execute pixel value presumption of an undefined pixel at high speed by executing an interpolation process.

For example, specifically, in the case where the pixel value of an undefined pixel for the synthetic image is defined by an interpolation process, a weighting interpolation process using a two-dimensional Gaussian function may be used. For example, in the case where an undefined pixel exists in the pixel position (i,j) of the synthetic image, the pixel value of the pixel position (i, j) is defined as p(i, j). In the weighting interpolation process using a two-dimensional Gaussian function, an interpolation calculation of the p(i,j) may be performed as in the following Expression (1).

$$p(i, j) = \frac{\sum_{k \in D(i,j)} w_k p_k}{\sum_{k \in D(i,j)} w_k} \quad (1)$$

Here, $w_k$ is a Gaussian weighting coefficient, and is a weighting coefficient which is in accordance with a two-dimensional Gaussian function value and varies as it goes away from the pixel position (i,j). Moreover, k is an index related to the pixel position, and $w_k$ is a Gaussian weighting coefficient in the index k, and $p_k$ is a pixel value in the index k. D(i, j) represents a set of pixel positions which is in proximity to the pixel position (i, j) and for which the pixel values are defined.

By using a weighting interpolation process using a two-dimensional Gaussian function described above, it is possible to interpolate an undefined pixel of the synthetic image and thus complete the image conversion process in the image conversion unit 108. The weighting interpolation process with a two-dimensional Gaussian function is used in the interpolation of an undefined pixel herein. However, any kind of method can be used as long as it is a process which interpolates a pixel value of an undefined pixel from the surrounding information of the undefined pixel.

As an example of other image conversion processes, a super resolution process which is a kind of an image restoration process can be used.

Hereafter, as an example for other image conversion processes, a super resolution process will be described as a process in the image conversion unit 108 to the synthetic image generated in the image synthesis unit 107. Here, in the super resolution process, a high resolution image is assumed, and a low resolution image is presumed from the assumed high resolution image, on the basis of a point spread function (PSF) of the shooting system. The super resolution process searches for a high resolution image with which the difference between the presumed low resolution image and the observed image becomes small. For example, processes described in WO06/052029 and WO04/068862 may be used as the super resolution process.

In the case where an undefined pixel exists in the pixels of the synthetic image, the super resolution process executes pixel value presumption of the undefined pixel with high precision in the image conversion process. Moreover, this super resolution process enables restoring and presuming highly defined pixel values for pixels other than the undefined pixel.

Figure 8:
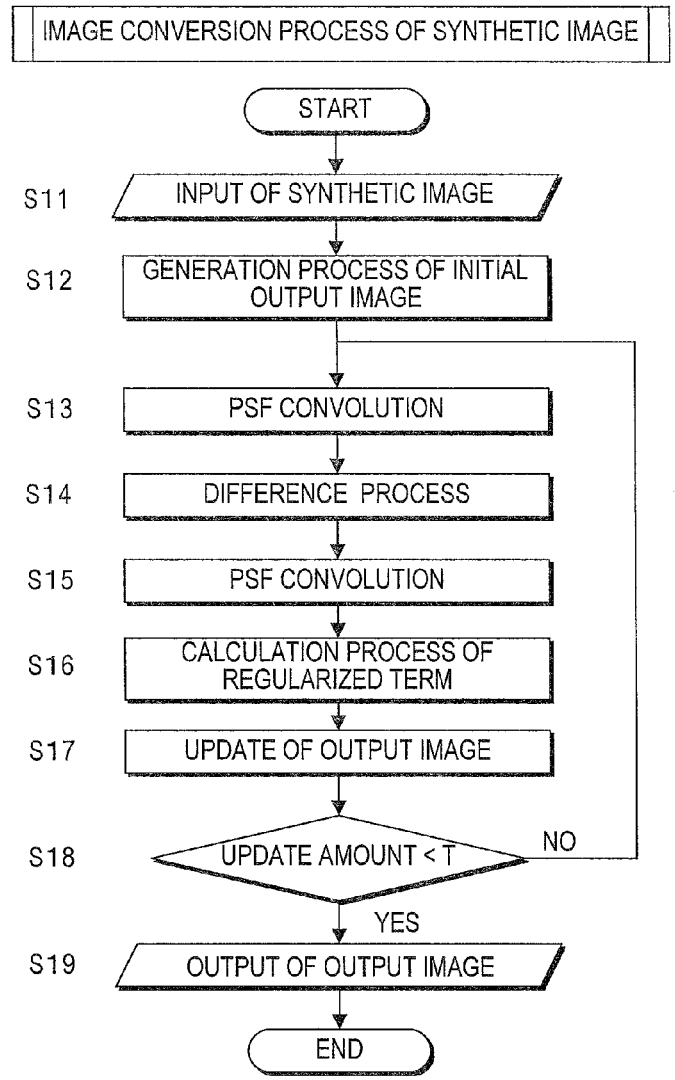
FIG. 8 is a flow chart which shows a super resolution process (super resolution processing means).

Specific algorithm of the super resolution process is shown in the flow chart in FIG. 8. Hereafter, the process will be described along with the processing flow of the algorithm.

In Step S11, the input process of the synthetic image y is executed. In Step S12, the initial output image is generated. For example, this process can use the weighting interpolation process which uses the above two-dimensional Gaussian function. With this process, the initial output image $z_o$, that is the synthetic image for which the undefined pixel is interpolated and defined, is generated.

In Step S13, a super resolution process which minimizes the evaluation function f(z) of the following Expression (2) with a steepest descent method is started.

$$f(z)=\|y-Az\|^2+\lambda g(z) \qquad (2)$$

Here, y is a synthetic image (vector expression) inputted in Step S11, z is a resulting image (vector expression) which is changed to a high resolution, and A is an image conversion matrix representing the shooting system including PSF, etc. g(z) is a normalization term (restricted term), etc., in consideration of correlation of the colors of the image and the smoothness of the image. λ is a weighting coefficient. If the steepest descent method is used, the differentiation value ∂f(z)/∂z at z of f(z) is calculated, and the differentiation value is added to z, so that the image is updated to obtain the minimum value of f(z). The differentiation value (slope) of f(z) is obtained by weighting addition of $A^T(y-Az)$ and ∂g(z)/∂z. Here, $A^T$ is a transposed matrix of A.

As in the following Expression (3), the differentiation value ∂f(z)/∂z is added to z, and the image is updated to obtain the minimum of f(z).

$$z_{n+1} = z_n + \alpha \frac{\partial f(z)}{\partial z} \qquad (3)$$

Here, $z_n$ represents the resulting image which changed into high resolution repeatedly n times, and α represents the step size of the update amount.

In Step S13, a convolution process (convolution integration process) with PSF (Point Spread Function) is executed to the output image z obtained in Step S12 or S18. That is, Az is calculated. Here, for example, PSF data which is retained in advance in the image conversion unit 108 may be used. Moreover, it may be arranged such that a plurality of pieces of PSF data are retained and appropriate PSF data may be selected in accordance with shooting parameters of the camera, which takes into account the shooting characteristics, such as an optical transfer function (OTF) and CCD aperture (CCD opening). PSF data which has a form of a two-dimensional Gaussian function is used fundamentally. Moreover, the PSF data is normalized so that the sum of the data coefficient of the PSF data is 1. Moreover, if the output image contains RGB colors, the above processing is executed independently for each of RGB.

In Step S14, the difference between the synthetic image y inputted in Step S11 and the output image Az generated in Step S13 is calculated to obtain a difference image (y−Az). At this time, an undefined pixel is contained in the synthetic image y. However, since the difference cannot be defined in the undefined pixel portion, undefined pixels are continued to be undefined pixels in the difference image. If the output image contains RGB colors, the above processing is executed for each of the RGB independently.

In Step S15, the convolution process of PSF is executed for the difference image (y−Az) generated in Step S14. That is, $A^T(y-Az)$ is calculated. In the case where the convolution process of PSF is executed, there is a possibility that an undefined pixel may be contained as a pixel to be used for the convolution process. Even if a convolution process is executed in the undefined pixel, the convolution cannot be defined for an undefined pixel. Accordingly, a convolution process is not executed for the undefined pixel. In this case, if the convolution process of PSF is executed only with the defined pixel, the sum of the data coefficient of the PSF data to be used may be less than 1. In this case, a normalizing process is executed to set the sum of the data coefficient of the PSF data to be used as 1. If the output image contains RGB colors, the above processing is independently executed to each of the RGB.

In Step S16, in addition to the image $A^T(y-Az)$ obtained in Step S15, the regularized image (∂g/∂z) is generated for converging the solution of the output image given from Step S12 or S18 to a desirable image. For example, in order to take into consideration the regularization condition that the edge of the output image is smooth, the regularized term g(z) can be given in Step S16 in relation to the output image given in Step S12 or S18. Specifically, a process is executed to generate the image, etc., by executing twice the convolution process (convolution integration process) of the Laplacian for the output image given in Step S12 or S18. The process in Step S16 may be omitted according to the circumstances. If the output image contains RGB colors, it may be arranged such that the above process is executed for the luminance signal obtained from the RGB.

In Step S17, a process executes the weighting addition of the images $A^T(y-Az)$ and (∂g/∂z) generated in Steps S15 and S16 to the output image (calculation of Expression (3)). This is an update process of the output image to obtain an output image $z_{n+1}$. The weighting coefficients of the images $A^T(y-Az)$ and (∂g/∂z) obtained in Steps S15 and S16 are assumed as λ1 and λ2, respectively. The update amount of the output image changes according to the values of λ1 and λ2. These λ1 and λ2 may be set appropriate values beforehand, or alternatively, they may be set appropriate values from the outside using the external I/F unit 113.

In Step S18, the sum of the absolute value of the pixel value of the images generated in Steps S15 and S16 is considered as the scalar update amount. If the update amount is smaller than a threshold T, the output image obtained in Step S17 is set as the final output image, and this final output image is outputted in Step S19. If the update amount is greater than or equal to the threshold T, the output image obtained in Step S17 is again inputted in Step S13, and the output image is again updated through Steps S13-S17. This process is repeated until the update amount becomes smaller than the threshold T in Step S18. It is noted that it may be arranged such that when the repetition count number has exceeded a certain count number (for example, 20 repetitions), the repetition process is ended to proceed to Step S19, and the output image is output as a final output image.

Thus, the finally outputted output image becomes the image after the image conversion in the image conversion unit 108 by the above processing of Steps S11 to S18. The image subjected to the image conversion process in the image conversion unit 108 is sent to the frequency characteristic measurement unit 109 that executes the measurement of spatial frequency characteristics.

Moreover, the image conversion unit 108 may execute image conversion of the standard image transferred from the registration unit 106 in addition to the image conversion of the synthetic image from the above image synthesis unit 107. The image conversion of the standard image acquired using the Bayer type color filter as in the present embodiment may be a color demosaicing process (interpolation process) which presumes a missing color channel from color mosaic-like raw data. With the demosaicing process, the standard image acquired through the Bayer type color filter becomes a full color image which has pixel values of all R, G, and B in each pixel position. Furthermore, in order to make the same image size (or image resolution) of the standard image and synthetic image, an image expansion process is executed in the image conversion processing. A known bicubic expansion method, a bilinear expansion method, etc., are used for the image expansion method used herein. With this process, the standard image subjected to the interpolation and expanding process is transferred to the frequency characteristic measurement unit 109. However, the transfer process of this standard image subjected to the image conversion to the frequency characteristic measurement unit 109 is not necessarily needed.

Moreover, as to the synthetic image transferred from the image synthesis unit 107, the image which does not contain the reference image in the image synthesis unit 107 (i.e., the standard image expanded with a predetermined expansion ratio in the image synthesis unit 107) may also be transferred to the image conversion unit 108. In this case, in the image conversion unit 108, the image conversion process is applied as in the image conversion process of the synthetic image containing the reference image, and the result is transferred to the frequency characteristic measurement unit 109. However, the image formed by the image conversion of the image which does not contain the reference image in the image synthesis unit 107 is not necessarily needed to be transferred to the frequency characteristic measurement unit 109.

It is noted that the image which is transferred from the buffer 105 and is generated through the registration unit 106, the image synthesis unit 107, and the image conversion unit 108 may be divided into partial image areas to undergo the processes. In this case, each partial image area is desirable to include overlapping area and undergo the processes. Moreover, in the case where the image generation is executed individually for the partial image areas through the registration unit 106, the image synthesis unit 107, and the image conversion unit 108, the partial image areas may be coincide with image areas to be selected in the image area selection unit 109a of the frequency characteristic measurement unit, which will be described below. It is possible to execute a registration process with high precision when the registration is executed for each partial image area, even if the image to be subjected to the registration includes different position displacements intermingled for each portion in the image. Moreover, in the case where the frequency characteristic measurement is executed for each partial area of the synthetic image, the frequency characteristic measurement unit becomes capable of detecting the error of the registration process for each partial area of the synthetic image.

Moreover, the image transferred from the buffer 105 and generated through the registration unit 106, the image synthesis unit 107, and the image conversion unit 108, shall be a partial area having the high frequency component of an image. By executing the image registration in the partial areas of the high frequency components of the image, it is possible to execute the registration process in image areas where the texture is complex, and therefore, it is possible to execute the registration process with high precision. Moreover, it is possible to execute the registration error detection in image areas where the texture is complex, and therefore, it is possible to execute the registration process with high precision.

The frequency characteristic measuring method in the frequency characteristic measurement unit 109 is executed by a two-dimensional Fourier transform, a one-dimensional Fourier transform, an image convolution process (convolution integration process), etc. It is noted that frequency characteristic value can be measured faster by the one-dimensional Fourier transform process than the two-dimensional Fourier transform. In the two-dimensional Fourier transform, detailed frequency characteristic values of the synthetic image can be measured.

Figure 9A:
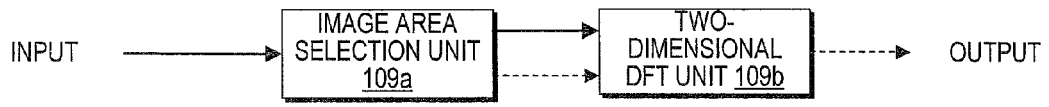
FIG. 9A is a block diagram of a frequency characteristic measurement unit (frequency characteristic measurement means).

Hereafter, the frequency characteristic measurement unit 109 will be described. FIG. 9A depicts a block diagram of the frequency characteristic measurement unit 109. The frequency characteristic measurement unit 109 includes an image area selection unit 109a and a two-dimensional DFT (discrete Fourier transform) unit 109b. The image area selection unit 109a is connected to an input line from the image conversion unit 108, and the two-dimensional DFT unit 109b. The two-dimensional DFT unit 109b is connected to the image area selection unit 109a and an output line to the registration error detection unit 110.

The signal flow will be described with reference to FIG. 9A. The image subjected to the image conversion is inputted from the input line from the image conversion unit 108, and is transferred to the image area selection unit 109a. The selected image, which is the image area selected in the image area selection unit 109a, is transferred to the two-dimensional DFT unit 109b with the position information on the selected image area. In the two-dimensional DFT unit 109b, a two-dimensional DFT operation (two-dimensional discrete Fourier transform operation) of the selected image is executed. The operation resultant value of the two-dimensional DFT operation is transferred to the registration error detection unit 110 via an output line to the registration error detection unit 110 as a frequency characteristic output.

Here, the image inputted from the image conversion unit 108 may contain an error-less image which does not have an error in the registration of the image. For example, the error-less image may be the standard image to which the interpolation and expansion process is executed in the image conversion unit 108. The error-less image may be an image which does not contain the reference image in the image synthesis unit 107 and went through the image conversion in the image conversion unit 108 (i.e., the standard image expanded with a predetermined expansion ratio in the image synthesis unit 107 and subjected to the image conversion in the image conversion unit 108). It should be noted that the standard image is shown herein as an example of the image before the registration process is executed. Moreover, the image which does not contain the reference image in the image synthesis unit 107 is shown as an example of the image in a situation before being superposed in the image synthesis unit 107. Furthermore, in the image synthesis unit 107, the image synthesis of the reference image(s) and the standard image is executed, and the synthetic image subjected to the image conversion in the image conversion unit 108 is defined as an "error verification image".

The image area selection unit 109a in the frequency characteristic measurement unit 109 executes an image area selection in the error verification image and the error-less image. The selected image (image area) and the position information on the selected image area are transferred to the two-dimensional DFT unit 109b. At this time, in the case where the error verification image and the error-less image are color images having RGB pixels, it may be arranged such that the luminance value is computed from the pixel values of RGB, and the luminance value is transferred to the two-dimensional DFT unit 109b as a new pixel value.

In the two-dimensional DFT unit 109b, a two-dimensional DFT operation is executed for the selected images which went through the area selection in the image area selection unit 109a. With this processing, the operation resultant value of the two-dimensional DFT operation is computed for the error verification image. Here, in the case where an error-less image is contained in the image transferred to the two-dimensional DFT unit 109b, the DFT operation resultant value of the error-less image is computed, in addition to the DFT operation resultant value of the error verification image. Furthermore, the absolute value of the difference between the DFT operation resultant values of the error verification image and the error-less image may be obtained and used as the final frequency characteristic output outputted from the frequency characteristic measurement unit 109.

By using the frequency characteristic of error-less images, such as an image before undergoing the registration process and an image before being superposed by the image synthesis unit, the frequency characteristic by the registration error is made conspicuous among the frequency characteristic of the synthetic image. Therefore, it is possible to execute the error determination of the registration process with high precision. Moreover, if the size of the image before being superposed by the image synthesis unit, and the synthetic image is the same, the error determination of the registration process can be executed simply. It should be noted that if an error-less image is not contained, the DFT operation resultant value of the error verification image by itself serves as the frequency characteristic output.

Figure 10A:
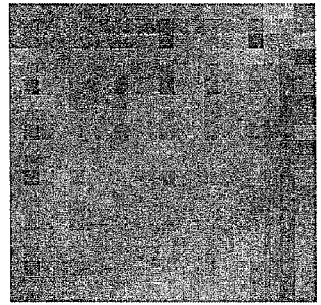
FIG. 10A is a diagram showing an error verification image.
Figure 10B:
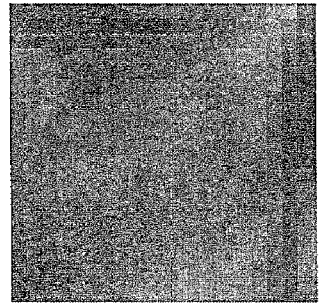
FIG. 10B is a diagram showing an error-less image.
Figure 10C:
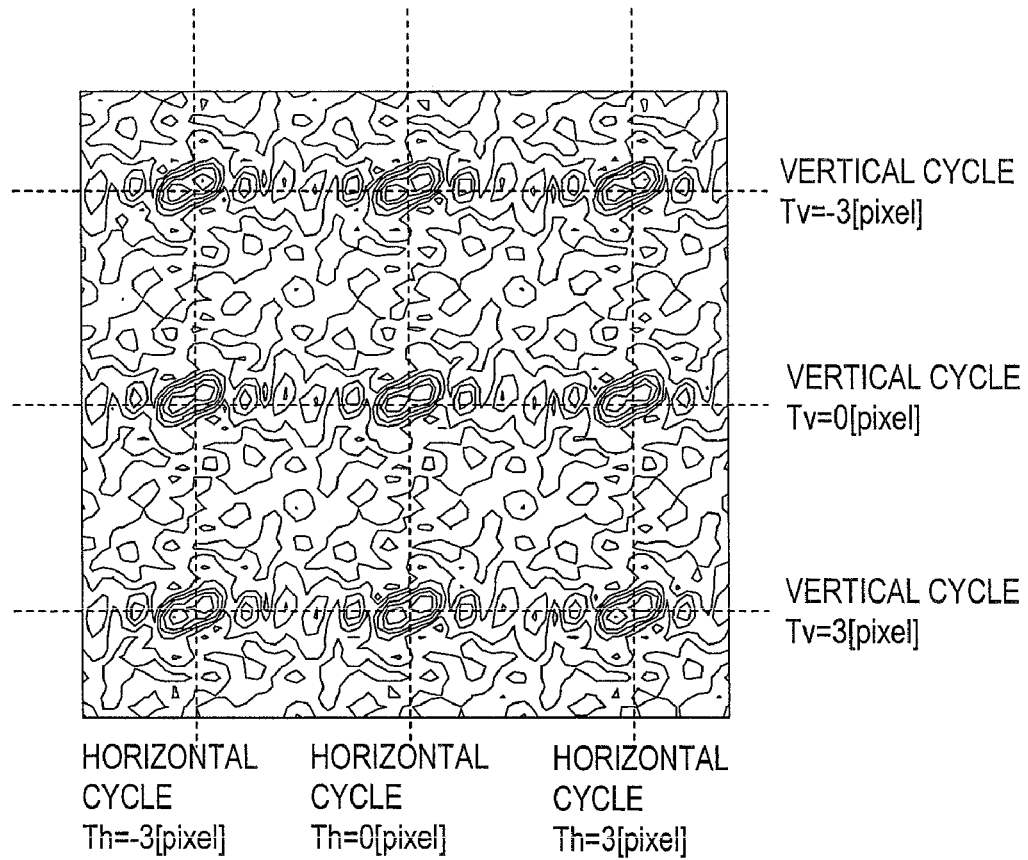
FIG. 10C is a diagram showing the difference of DFT operation resultant values between an error verification image and an error-less image.

FIG. 10A depicts image data of an error verification image, FIG. 10B depicts image data of an error-less image, and FIG. 10C depicts an example of the difference of the DFT operation resultant values for an error verification image and an error-less image. Here, there is an error in the registration process in the image data of the error verification image, and therefore, artifacts appear in particle-like form. As a result, in the difference of the DFT operation resultant values, peculiar peak values appear at locations of 3 pixel vertical cycle and 3 pixel horizontal cycle. It is noted that in this example, the expansion ratio in the image synthesis unit 107 is 3, and therefore, characteristic peaks appear at locations of 3 pixel cycle. Since the image is expanded, if the expansion ratio is F, the frequency component (periodic component) which significantly changes with the error in the image registration process becomes a component of F pixel cycle. Therefore, the difference of the DFT operation resultant values between the error verification image and the error-less image creates peculiar peeks at locations of F pixel cycle.

Moreover, in the frequency characteristic measurement unit 109, although a two-dimensional DFT operation is used as a frequency characteristic measurement means, a one-dimensional DFT operation process may also be used.

Figure 9B:
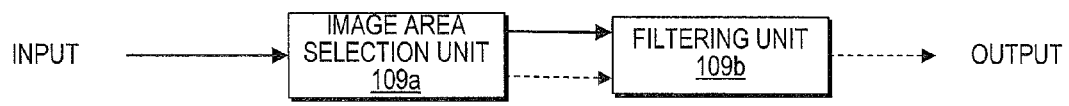
FIG. 9B is another block diagram of a frequency characteristic measurement unit.

Moreover, other than the DFT operation process, the bandpass filtering process which can detect the above-described characteristic peeks may be used. A block diagram of the frequency characteristic measurement unit 109 in this case is shown in FIG. 9B. In FIG. 9B, unlike FIG. 9A, the two-dimensional DFT unit 109b is replaced by the filtering unit 109b. In the filtering unit 109b, for example, if the expansion ratio in the above-described image synthesis unit 107 is 3, a bandpass filtering is executed to extract an image component belonging to a frequency range of 3 pixels vertical cycle, and 3 pixels horizontal cycle. An example of such a bandpass filter is a bandpass filter which extracts a part of wavelet transform coefficients. Similarly to the case of FIG. 9A, if an error-less image is contained in the transferred image, the filtering result of the error-less image is computed in addition to the filtering result of the error verification image.

The absolute value of the difference of the filtering results between the error verification image and the error-less image is obtained as the final frequency characteristic output outputted from the frequency characteristic measurement unit 109. In the case where an error-less image is not contained, the filtering result of the error detection image by itself serves as the frequency characteristic output.

It becomes possible to extract an exact arbitrary frequency component value by measuring the frequency characteristic with a filtering process. Moreover, it becomes possible to extract the frequency component value with a general-purpose convolution process by preparing a plurality of filter coefficients.

Moreover, the position information on the image area as the selected image for which the frequency characteristic was measured in the frequency characteristic measurement unit, is also transferred from the frequency characteristic measurement unit to the registration error detection unit 110.

As described in the above, the frequency characteristic output and the position information on the image area as the selected image for which the frequency characteristic was measured, are transferred from the frequency characteristic measurement unit 109 to the registration error detection unit 110, and go through the detection process of the registration error.

Figure 11:
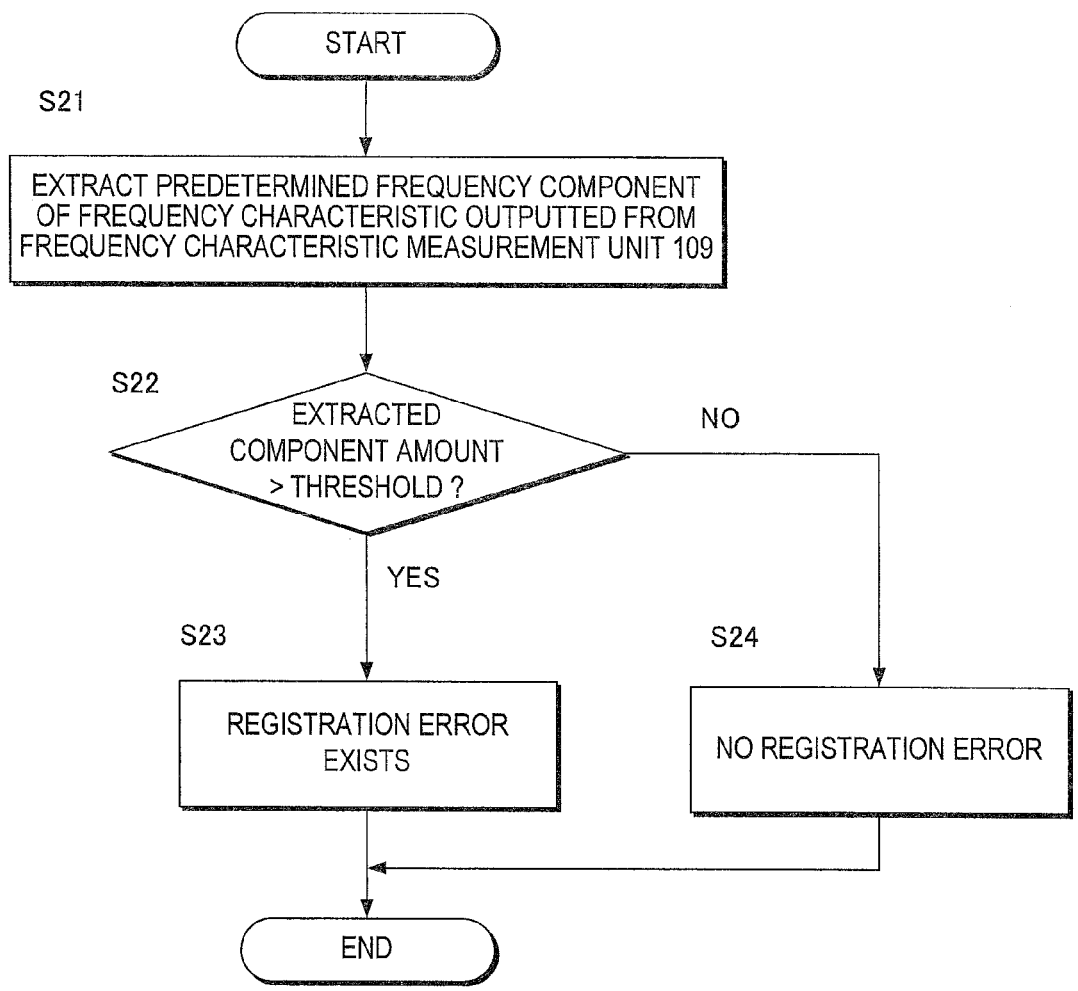
FIG. 11 is a flow chart which shows a registration error detection process (registration error detection means).

Hereafter, the registration error detection process in the registration error detection unit 110 will be described with reference to FIG. 11. The flow chart in FIG. 11 shows an algorithm of a registration error detection process.

In Step S21, as to the frequency characteristic output, for example, if the expansion ratio in the image synthesis unit 107 is three, the extraction of the frequency component for the frequency characteristic near the 3 pixel horizontal cycle and 3 pixel vertical cycle from the frequency characteristic output result (i.e., extraction of periodic components) is executed. In the frequency characteristic measurement in the above-described bandpass filtering, the component extraction has already executed to the frequency characteristic near the 3 pixel horizontal cycle and 3 pixel vertical cycle, and the extraction in this step is not necessary. Here, although the case where the expansion ratio is three is adopted as an example, the expansion ratio may be of any value. The range of the extracted component of the frequency characteristic differs according to the expansion ratio. For example, if the expansion ratio is F, the extraction of a periodic component is executed for the frequency characteristic near the F pixel horizontal cycle and F pixel vertical cycle.

Thus, a specific frequency component which changes with the error in the registration process is extracted from the relation between the resolution of the plurality of images to be subjected to the registration and the resolution of the synthetic image (i.e., expansion ratio). Thereby, it is possible to handle the influence of only the frequency component, and therefore, it becomes possible to execute a determination process of the registration error with high precision and efficiently.

In Step S22, it determines whether the component amount extracted in Step S21 is larger than a predetermined threshold or not. If the extracted frequency component amount is larger than a predetermined threshold, a process of Step S23 is executed. In Step S23, it is determined as to the registration process in the registration unit 106 that there is an error in the registration with respect to the position where the selected image belongs, and therefore a signal which informs that there is an error in the registration is transferred to the registration unit 106. If the extracted component amount is smaller than a predetermined threshold, a process of Step S24 is executed. In Step S24, it is determined as to the registration process in the registration unit 106 that the registration process is executed correctly with respect to the position where the selected image belongs, and therefore a signal which informs that the registration is correct is transferred to the registration unit 106.

As described in the above, the registration error detection process is executed sequentially for the selected images selected in the frequency characteristic measurement unit 109.

Thus, the registration unit, which received a notification of whether the registration is an error or is not an error from the registration error detection unit 110, can select whether to execute an exclusion of the synthesis of the image which went through the registration process, or to execute a re-registration process. It should be noted that if the image generation through the registration unit 106, the image synthesis unit 107, and the image conversion unit 108 is executed by dividing into partial image areas, the partial area which includes an error of the registration process may be excluded from the registration process.

For example, in the case where it is determined that the registration includes an error, if the synthesis of the image subjected to that registration is excluded, the registration unit 106 further transfers to the image synthesis unit 107 the signal which is received from the registration error detection unit 110 and which notifies the error of the registration process. Then, among the retained synthetic images in the synthetic image retention unit 107b, the image synthesis unit 107 executes the exclusion process of a reference image used for the above synthesis. As a result, it is possible to obtain the result that does not contain a registration error in the synthetic image. The area where the reference image is excluded is again defined as undefined pixels.

Moreover, for example, in the case where it is determined that the registration is an error, the information of the image partial area that is determined as having a registration error in the registration error detection unit 110, is transferred to the registration unit 106. Then, for the partial image area determined as having the error, the registration process of the image is again executed in the registration unit 106. As a result, it is possible to obtain a result that does not contain a registration error in the synthetic image. Moreover, the information of the image area determined as having a registration error in the registration error detection unit 110 may be transferred to the image synthesis unit 107. The image synthesis process, the image conversion process, the frequency characteristic measurement process, and the registration error detection process are executed again in the image synthesis unit 107, the image conversion unit 108, the frequency characteristic measurement unit 109, and the registration error detection unit 110. Moreover, these processes may be repeated any number of times.

As described in the above, the registration process and the registration error detection are executed in the registration unit 106. Then, the image conversion process is executed in the image conversion unit 108 in the situation where the reference image including the registration error is excluded, and the processing result of the image conversion is recorded in the image recording unit 111 from the image conversion unit 108. The image recorded in the image recording unit 111 works together with an external device through an input and output interface with the outside, and can be used as various information resources.

Although the above embodiment is premised on processing by hardware which includes memory, logical circuit, etc., it does not need to be limited to such configuration. For example, a plurality of color video image signals from the CCD 102 may be output as RAW data which is unprocessed data so as to be processed in software separately. In addition, information of the color filter, the exposing condition at the time of the shooting, and the function used in the chroma correction process, etc., may be output as the header information so as to be processed in software separately.

Figure 12:
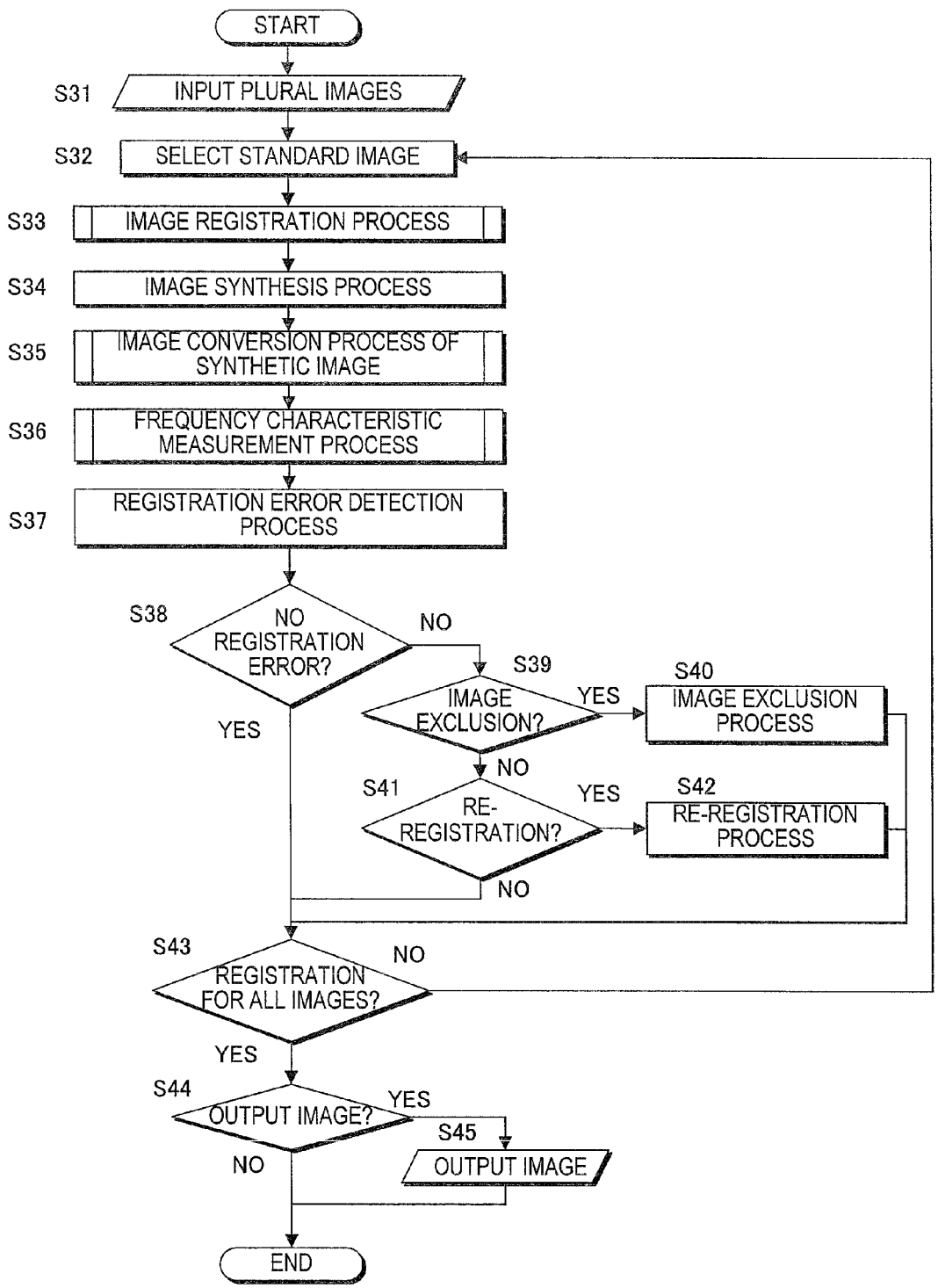
FIG. 12 is a flow chart which shows an image process executed by software.

FIG. 12 depicts a flow chart in the case where the software operated on a computer executes the above image processing. The software is stored on a computer readable storage medium as a program. The program is encoded and stored in a computer-readable format. The computer includes a microprocessor and a memory, for example. The program includes a program code (command) for causing the computer to execute the image processing. In Step S31, a plurality of images, and header information, such as the type of the color filter, are read. In Step S32, one of the plurality of sheets of images inputted in Step S31 is selected as a standard of the registration process, and is set as the standard image. In Step S33, a registration process is executed in sequence between the standard image and images other than the standard image (each of such images is referred to as a "reference image"). The details of the registration process in Step S33 are realized by implementing the processing in the registration unit 106 on software processing.

In Step S34, the image synthesis process is executed based on the standard image and the reference image which went through the registration process in Step S33, and the registration amount between the images. The details of the image synthesis process in Step S34 are realized by implementing the process in the image synthesis unit 107 on software processing. In Step S35, the image conversion process is executed for the synthetic image subjected to the image synthesis process in Step S34. The details of the image conversion process in Step S35 are realized by implementing the processing in the above-described image conversion unit 108 on software. In Step S36, the frequency characteristic measurement process is executed for the image subjected to the image conversion process in Step S35. The details of the frequency characteristic measurement process in Step S36 is realized by implementing the processing in the above-described frequency characteristic measurement unit 109 by a two-dimensional DFT operation process on software processing, etc.

In Step S37, the registration error detection process is executed using the frequency characteristic of the image measured in Step S36. In Step S37, the frequency component extraction process in the registration error detection unit 110 and the comparison process between the extracted component amount and the threshold are realized by implementing on software processing. In Step S38, it determines whether the registration process is executed correctly or not using the registration error detection result in Step S37. If the registration process is not executed correctly, the process proceeds to Step S39. If the registration process is executed correctly, the process proceeds to Step S43.

In Step S39, it determines whether to exclude the image area where the registration is not executed correctly. If it is determined to exclude the image area, the process proceeds to Step S40. If it is determined not to exclude the image area, the process proceeds to Step S41. In Step S40, the exclusion process of the image area is executed. In this exclusion process, as to the synthetic image subjected to the image synthesis process in Step S34, the exclusion process of image data is executed for the image area where the registration process is not executed correctly. After executing the exclusion process, the process proceeds to Step S43. In Step S41, it determines whether to execute the re-registration process or not in the image area where the registration process is not executed correctly. If the re-registration is to be executed, the process proceeds to Step S42. If the re-registration is not to be executed, the process proceeds to Step S43. In Step S42, the re-registration process is executed for the image area where the registration process was not executed correctly. As to the details of the re-registration process, it uses the same method as the image registration process in Step S33. After executing the re-registration process, the process proceeds to Step S43.

In Step S43, it determines whether the registration process is executed in all images of the plurality of sheets of images or not. If the registration process is executed in all images, the process proceeds to Step S44. If the registration process is not executed in all images, the process returns to Step S32. In Step S32, the reference image which did not go through the registration and the standard image are selected, and the processes in and after Step S33 are executed in sequence again to execute the registration process, the image synthesis process, the image conversion process, the frequency characteristic measurement process, and the registration error detection process.

In Step S44, it determines whether to output the image or not. If outputting the image, the process proceeds to Step S45 to output the image subjected the image conversion process in Step S35 as the final output result. If not outputting the image, software processing is ended while still retaining the image subjected to the image conversion process in Step S35 in the memory section on software. By post processing, the image retained in the memory section on software can be read to be used. With the above processing, it is possible to realize separately a configuration which executes processes by software.

Figure 13:
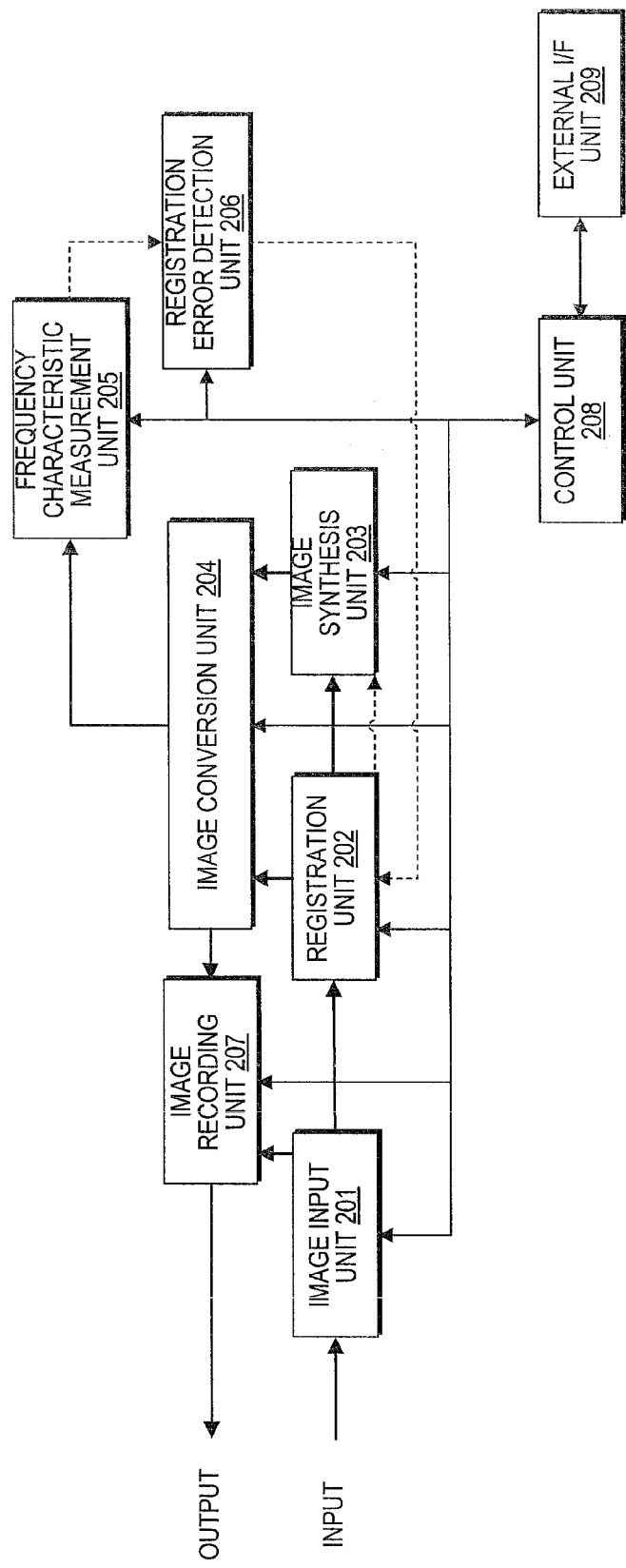
FIG. 13 is a block diagram showing an image processing apparatus in accordance with the second embodiment.

Now, the second embodiment will be described with reference to FIG. 13. In the second embodiment, the lens system 100, the CFA 101, the CCD 102, the amplifier 103, the A/D 104, and the buffer 105 in the first embodiment are replaced with an image input unit 201.

The image input unit 201 includes an input interface which inputs the image data from the outside. The image input unit 201 is connected to a registration unit 202, an image recording unit 207, and a control unit 208. The registration unit 202 is connected to the image input unit 201, the image synthesis unit 203, the image conversion unit 204, and the control unit 208. The image synthesis unit 203 is connected to the registration unit 202, the image conversion unit 204, and the control unit 208. The image conversion unit 204 is connected to the registration unit 202, the image synthesis unit 203, the frequency characteristic measurement unit 205, the image recording unit 207, and the control unit 208.

The frequency characteristic measurement unit 205 is connected to the image conversion unit 204, the registration error detection unit 206, and the control unit 208. The registration error detection unit 206 is connected to the registration unit 202, the frequency characteristic measurement unit 205, and the control unit 20Q. The image recording 207 is connected to an image resource output interface to the outside, the image input unit 201, the image conversion unit 204, and the control unit 208. The control unit 208 is connected to the image input unit 201, the registration unit 202, the image synthesis unit 203, the image conversion unit 204, the frequency characteristic measurement unit 205, the registration error detection unit 206, the image recording unit 207, and the external I/F unit 209. The external I/F unit 209 is connected to the control unit 208.

The flow of the image signal in FIG. 13 will be described. A plurality of sheets of images inputted via the external input interface is inputted into the registration unit 202 in sequence through the image input unit 201. Here, in the case where the image inputted via the external input interface is a single sheet of an image, or there is a plurality of sheets of images but there is no correlation between the images so that registration of the images is impossible, the image(s) inputted from the input unit 201 can be recorded and retained in the image recording unit 207 by transferring the image from the image input unit 201 to the image recording unit 207 via the external I/F unit 209 and the control unit 208. In the case where the recording and the retention in the image recording unit 207 are not executed, the image data goes through the registration process by the registration unit 202 in sequence.

Thereafter, the image subjected to the registration process in the registration unit 202 is transferred to the image synthesis unit 203 to undergo the image synthesizing process. The synthetic image synthesized in the image synthesis unit 203 is transferred to the image conversion unit 204. Simultaneously, the image data transferred to the registration unit 202 may be transferred to the image conversion unit 204 without modification. Whether to execute this transfer processing or not is determined by the setting process by the external I/F unit 209.

The image subjected to the image conversion in the image conversion unit 204 is transferred to the frequency characteristic measurement unit 205. In the frequency characteristic measurement unit 205, the frequency characteristic value is measured for the image subjected to the conversion in the image conversion unit 204, and the frequency characteristic value is transferred to the registration error detection unit 206. In the registration error detection unit 206, based on the frequency characteristic value transferred from the frequency characteristic measurement unit 205, the registration error determination is executed and the outputted registration error determination information is transferred to the registration unit 202.

Based on the registration error determination information transferred from the registration error detection unit 206, the registration unit 202 applies a registration image exclusion process, a re-registration process, etc., to execute the registration process again. At the time when the registration process and the image conversion process are ended, the image subjected to the image conversion in the image conversion unit 204 is transferred to the image recording unit 207 to execute the image recording. The image recorded in the image recording unit 207 mutually connects with external devices of the image processing apparatus via the external output interface, and can be used freely as image information resources.

The registration process in the registration unit 202 is a similar process to the registration unit 106 according to the first embodiment. The image synthesis process in the image synthesis unit 203 is a similar process to the image synthesis unit 107 according to the first embodiment. The image conversion process in the image conversion unit 204 is a similar process to the image conversion unit 108 according to the first embodiment. The frequency characteristic measurement process in the frequency characteristic measurement unit 205 is a similar process to the frequency characteristic measurement unit 109 according to the first embodiment. The registration error detection process in the registration error detection unit 206 is a similar process to the registration error detection unit 110 according to the first embodiment.

Furthermore, although the above embodiment is premised on a process by hardware, it is not limited to such configuration. For example, if the inputted image is Raw data and arrangement information of the color filter at the time of the shooting, etc., are outputted as header information, it can process by software separately. The software processing in this case may be a process shown in the flow chart in FIG. 12 as in the first embodiment.

As described in the above, in a present invention, upon executing the registration process among a plurality of sheets of images, synthesis between images is executed according to the estimation amount of the inter-image displacement presumed by the registration process. Thereafter, artifacts peculiar to the image synthesis result are detected if an error arises in the registration process. The registration error among a plurality of sheet images is detected depending on the presence or absence of the artifacts. Therefore, according to the present invention, even if aliasing is present in the image, it is possible to prevent incorrect determination with respect to the registration error due to the influence of the aliasing, and to detect the registration error stably. Moreover, it is possible to detect the error in the registration process in the situation where the resolution of the image is increased.

It is clear that various changes can be made to the present invention within the scope of the technical idea without being limited to the above embodiments.

What is claimed is:

1. An image processing apparatus, comprising:
a registration unit for executing a registration process among a plurality of images;
an image synthesis unit for superposing the plurality of images subjected to registration in the registration unit to synthesize the plurality of images and generate a synthetic image;
a frequency characteristic measurement unit for measuring a frequency characteristic of the synthetic image; and
a registration error detection unit for detecting an error of the registration process among the plurality of images based on the measured frequency characteristic of the synthetic image.

2. The image processing apparatus according to claim 1, wherein the frequency characteristic measurement unit measures the frequency characteristic for each partial area of the synthetic image, and
wherein the registration error detection unit detects an error of a registration process for each partial area of the synthetic image.

3. The image processing apparatus according to claim 1, wherein the registration unit executes registration for each partial area of the plurality of images.

4. The image processing apparatus according to claim 1, wherein the registration unit executes the registration process in a portion containing a high frequency component of the plurality of images.

5. The image processing apparatus according to claim 1, wherein the registration unit executes registration of one standard image and other reference images among the plurality of images, and detects an image displacement of the reference image to the standard image with resolution higher than pixel units of the standard image and the reference image.

6. The image processing apparatus according to claim 5, wherein the image synthesis unit synthesizes, based on the detected image displacement, the standard image and the reference images in a resolution space whose resolution is higher than pixel units of the standard image and the reference image.

7. The image processing apparatus according to claim 1, wherein the image synthesis unit further includes an image conversion unit for converting the synthetic image so that a pixel value is assigned to an undefined pixel.

8. The image processing apparatus according to claim 7, wherein the image conversion unit executes an interpolation process of the synthetic image.

9. The image processing apparatus according to claim 7, wherein the image conversion unit executes an image super resolution process.

10. The image processing apparatus according to claim 2, wherein if an error of the registration process is detected in the registration error detection unit, the registration unit excludes from the registration process a partial area in which the error of the registration process has occurred.

11. The image processing apparatus according to claim 2, wherein if an error of a registration process is detected in the registration error detection unit, the registration unit executes a registration process again for a partial area in which the error of the registration process has occurred.

12. The image processing apparatus according to claim 1, wherein the frequency characteristic measurement unit measures a frequency characteristic of the synthetic image generated by the image synthesis unit by a one-dimensional Fourier transform of the synthetic image.

13. The image processing apparatus according to claim 1, wherein the frequency characteristic measurement unit measures a frequency characteristic of the synthetic image generated by the image synthesis unit by a two-dimensional Fourier transform of the synthetic image.

14. The image processing apparatus according to claim 12, wherein the registration error detection unit obtains a particular frequency component changed by the error of the registration process on the basis of a relation between resolution of the plurality of images to be subjected to registration in the registration unit and resolution of the synthetic image synthesized in the image synthesis unit, so as to extract the particular frequency component from the frequency characteristic of the synthetic image.

15. The image processing apparatus according to claim 13, wherein the registration error detection unit obtains a particular frequency component changed by the error of the registration process on the basis of a relation between resolution of the plurality of images to be subjected to registration in the registration unit and resolution of the synthetic image synthesized in the image synthesis unit, so as to extract the particular frequency component from the frequency characteristic of the synthetic image.

16. The image processing apparatus according to claim 1, wherein the frequency characteristic measurement unit measures the frequency characteristic of the synthetic image by a filtering process.

17. The image processing apparatus according to claim 16, wherein the filter used in the filtering process is a bandpass filter which extracts a frequency component identified from a relation between resolution of the plurality of images to be subjected to registration in the registration unit and resolution of the synthetic image synthesized in the image synthesis unit.

18. The image processing apparatus according to claim 15, wherein the relation between resolution of the plurality of images and resolution of the synthetic image is an expansion ratio which is a ratio of the resolution of the synthetic image to the resolution of the plurality of images.

19. The image processing apparatus according to claim 7, wherein the frequency characteristic measurement unit further detects a frequency characteristic of one of the plurality of images converted by the image conversion unit, and
wherein the registration error detection unit detects the error of the registration process using the further detected frequency characteristic.

20. The image processing apparatus according to claim 1, wherein the frequency characteristic measurement unit further detects a frequency characteristic of one of the plurality of images in a situation before being superposed by the image synthesis unit, and wherein the registration error detection unit detects the error of the registration process using the further detected frequency characteristic.

21. The image processing apparatus according to claim 20, wherein the situation before being superposed by the image synthesis unit is a situation where the one of the plurality of images is converted such that image size of the one of the plurality of images is same as that of size of the synthetic image.

22. A non-transitory computer readable storage medium storing an image processing program, wherein the image processing program instructs a computer to execute a method comprising:

a registration step for executing a registration process among a plurality of images;

an image synthesis step for superposing and synthesizing the plurality of images subjected to registration in the registration step, so as to generate an synthetic image;

a frequency characteristic measurement step for measuring a frequency characteristic of the synthetic image; and a registration error detection step for detecting an error of the registration process among the plurality of images based on the measured frequency characteristic of the synthetic image.

\* \* \* \* \*